United States Patent
Murakami et al.

(10) Patent No.: US 7,063,454 B2
(45) Date of Patent: Jun. 20, 2006

(54) HEAT EXCHANGE SYSTEM AND ROTOR HAVING THE SAME

(75) Inventors: Masao Murakami, Takasago (JP); Norifumi Yamada, Takasago (JP); Masaki Naoi, Takasago (JP); Masahiko Sawa, Takasago (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 287 days.

(21) Appl. No.: 10/657,253

(22) Filed: Sep. 9, 2003

(65) Prior Publication Data
US 2005/0276157 A1 Dec. 15, 2005

(30) Foreign Application Priority Data
Sep. 18, 2002 (JP) ............... 2002-271560

(51) Int. Cl.
*B01F 15/06* (2006.01)
(52) U.S. Cl. .................................... 366/147
(58) Field of Classification Search ............... 366/144, 366/147, 149; 165/177, 179
See application file for complete search history.

(56) References Cited

U.S. PATENT DOCUMENTS

| | | | | |
|---|---|---|---|---|
| 1,881,994 A | * | 10/1932 | Banbury | 366/147 |
| 3,020,025 A | * | 2/1962 | O'Mara | 366/147 |
| 3,285,330 A | * | 11/1966 | Root | 366/147 |
| 3,563,710 A | * | 2/1971 | Dew, Jr. et al. | 366/147 |
| 3,734,471 A | * | 5/1973 | Engels | 366/149 |
| 3,820,597 A | * | 6/1974 | Bittner et al. | 366/147 |
| 4,233,820 A | * | 11/1980 | Driver | 138/120 |
| 4,316,671 A | * | 2/1982 | Christen et al. | 366/192 |
| 4,527,902 A | * | 7/1985 | Christen | 366/147 |
| 4,697,501 A | * | 10/1987 | Hupf | 138/110 |
| 5,549,154 A | | 8/1996 | Niskanen et al. | 165/89 |
| 5,791,370 A | * | 8/1998 | Harland | 165/104.19 |
| 2002/0088120 A1 | | 7/2002 | Laitinen et al. | 29/895.22 |

FOREIGN PATENT DOCUMENTS

| | | |
|---|---|---|
| DE | 199 36 077 A1 | 4/2001 |
| JP | 5-104262 | 4/1993 |
| JP | 5-261725 | 10/1993 |
| JP | 9-277145 | 10/1997 |

OTHER PUBLICATIONS

Patent Abstracts of Japan, JP 09-277145, Oct. 28, 1997.

* cited by examiner

*Primary Examiner*—Tony G. Soohoo
(74) *Attorney, Agent, or Firm*—Oblon, Spivak, McClelland, Maier & Neustadt, P.C.

(57) ABSTRACT

A heat exchange system includes a rotor, a hole, a main tube, and branch tubes. The rotor, the outer surface of which is in contact with a kneaded object, has a heat-exchange chamber therein, in which a heat medium flows. The hole having a diameter less than that of the heat-exchange chamber is formed on one end of the rotor. The main tube is insertable through the hole and communicates with the heat-exchange chamber. Its diameter is determined such that a given space is ensured between the hole and the main tube. Each branch tube extends from the periphery of the main tube towards the surface of the heat-exchange chamber and has an opening on its top end, through which the main tube communicates with the heat-exchange chamber. The branch tubes are flexible to pass through the space when the main tube is inserted or removed.

6 Claims, 8 Drawing Sheets

HEAT EXCHANGE SYSTEM AND ROTOR HAVING THE SAME

BACKGROUND OF THE INVENTION

1. Field of the Invention

The present invention relates to a heat exchange system for cooling or heating an object subjected to heat exchange (hereinafter referred to as heat-exchange object) in contact with an outer surface of a body by passing a heat transfer medium through a heat-exchange chamber in the body, and a rotor having the same.

2. Description of the Related Art

In manufacturing equipment for kneading, coating or a rolling process, rotors or rollers having a heat exchange system are commonly used to maintain temperatures of raw materials or fabricated materials in a predetermined range by heating or cooling.

This conventional heat exchange system, as typically shown in a bored roll, has a large heat-exchange chamber in a body of a roller or a rotor. A supply pipe communicates with the heat-exchange chamber. A heat transfer medium, such as cooling water, is fed into the heat-exchange chamber from one end of the body through the supply pipe and discharged at the same end, as is disclosed in Japanese Unexamined Patent Application Publication No. 5-104262 (shown in FIG. 1 of disclosed document). Alternatively, as typically shown in a drilled roll, a plurality of flow channels are formed along an outer surface of the body from one end to the other end and the heat transfer medium flows through the channels, as is disclosed in Japanese Unexamined Patent Application Publication No. 9-277145 (shown in FIG. 1 of disclosed document). Additionally, the body, which is composed of a plurality of components, and a flow channel of the heat transfer medium are formed in one operation, as is disclosed in Japanese Unexamined Patent Application Publication No. 5-261725 (shown in FIG. 3 of disclosed document).

In bored roll methods, generating high uniform heat exchange capability over the whole body requires the heat transfer medium with a predetermined temperature to flow rapidly and turbulently near a wall of the heat-exchange chamber in the body; however, it is difficult to enable the heat transfer medium to flow at sufficient velocity since the heat transfer medium flows from the supply pipe having a small flow cross-sectional area to the heat-exchange chamber in the body having a large flow cross-sectional area. In addition, the flow of the heat transfer medium from one end to the other end of the body generally causes a big difference between temperatures on the upstream side and on the downstream side. As a result, the total heat exchange capability is disadvantageously lowered and the heat exchange capability along an axis of the body is not uniform.

Alternatively, a plurality of ports are formed on an outer periphery of the supply pipe and jet streams of the heat transfer medium are discharged to an inner surface of the heat-exchange chamber. In this case, a long distance between the supply pipe and the inner surface of the heat-exchange chamber significantly reduces the flow velocity of the heat transfer medium at the inner surface due to flow resistance.

On the other hand, in drilled roll methods, the formation of a flow channel having a small flow cross-sectional area along the outer surface of the body allows the heat transfer medium to flow rapidly through the flow channel. However, the flow of the heat transfer medium from one end to the other end of the body disadvantageously causes the heat exchange capability along the axis of the body to be non-uniform due to a big difference between the temperatures on the upstream side and on the downstream side. Further, this method requires a drilling process for forming the flow channel along the outer surface of the body, resulting in high manufacturing cost. Also, this method cannot be applied to a complicated-shaped body.

Forming the body from a plurality of components allows for a formation of desired flow channels even if the body has a complicated-shaped outer surface; however, a large number of body components and complexity of the structure increase time and cost for manufacturing the body. In addition, the flow of the heat transfer medium from one end to the other end of the heat-exchange chamber having a large flow cross-sectional area may disadvantageously cause the total heat exchange capability to be lowered and the heat exchange capability along the axis of the body to be non-uniform.

SUMMARY OF THE INVENTION

Accordingly, it is an object of the present invention to provide a heat exchange system and a rotor having the same for increasing the total heat exchange capability with uniform heat exchange capability along an axis of the body, and also a heat exchange system and a rotor which can be manufactured in a short period of time and at low cost.

According to the present invention, the heat exchange system includes a body, an inlet, a main tube, and branch tubes. The body, the outer surface of which is in contact with a heat-exchange object, has a heat-exchange chamber therein, in which a heat transfer medium flows. The inlet, which is formed on at least one end of the body, has a diameter less than that of the heat-exchange chamber. The main tube has a predetermined diameter so that a given space is ensured between the inlet and the main tube. The main tube is insertably disposed in the heat-exchange chamber through the inlet and communicates with the heat-exchange chamber. The heat transfer medium is fed or discharged through the main tube. The branch tubes extend from the periphery of the main tube and each of the branch tubes has an opening on the top end, through which the main tube communicates with the heat-exchange chamber. The branch tubes are flexible so that they can pass through the space described above when the main tube is inserted or removed.

According to the structure described above, since the main tube and the branch tubes prevent the heat transfer medium from contacting with a heat transfer medium inside the heat-exchange chamber, the heat transfer medium having almost the same temperature is ejected from each opening of the branch tube. Each of the branch tubes extends from the periphery of the main tube so that the opening of the branch tube is closer to the surface of the heat-exchange chamber than to the periphery of the main tube. As a result, the heat transfer medium in the heat-exchange chamber resists the flow of the heat transfer medium ejected from the branch tube in such a short distance that the heat transfer medium hits against the surface of the heat-exchange chamber at a high flow velocity. Accordingly, the heat transfer medium with axially uniform temperature distribution flows near the surface of the heat-exchange chamber rapidly and turbulently. This produces a high uniform heat exchange capability over the whole body.

Further, the branch tubes are formed such that they can pass through the space between an inlet and the main tube. In addition, the branch tubes are flexible. Accordingly, the branch tubes can be oriented towards the surface of the heat-exchange chamber by just inserting the main tube into the heat-exchange chamber through the inlet even if the heat-exchange chamber has a complicated-shaped surface. The branch tubes can be removed from the system with the main tube by just removing the main tube through the inlet. The ease of inserting or removing the main tube and the branch tubes provides the heat exchange system with excellent cooling capability described above in a simple way and at low cost.

Preferably, in this heat exchange system, branch tubes extend towards the surface of the heat-exchange chamber. This provides higher heat exchange capability, because the opening of the branch tube is in the vicinity of the surface of the heat-exchange chamber.

Preferably, in this heat exchange system, a nozzle is provided on the opening of each branch tube. As a result, the direction of the flow of the heat transfer medium can be corrected.

Preferably, in this heat exchange system, the branch tubes may be coiled springs whose turns are in close contact with each other in a free state. As a result, the branch tubes can be obtained in a simple way and at low cost.

Preferably, in this heat exchange system, the branch tubes are composed of tubes having flexibility and leaktight to a fluid, and coiled springs are wound around the tubes to support the tubes. As a result, the heat transfer medium can be ejected from the branch tubes more efficiently.

Preferably, a kneading or extruding rotor includes the heat exchange system that has a heat-exchange chamber having a non-circular cross-section which is twisted along the axis of the heat-exchange chamber. Accordingly, a rotor having the heat exchange system can be obtained in a simple way and at low cost.

DESCRIPTION OF THE PREFERRED EMBODIMENTS

Figure 1:
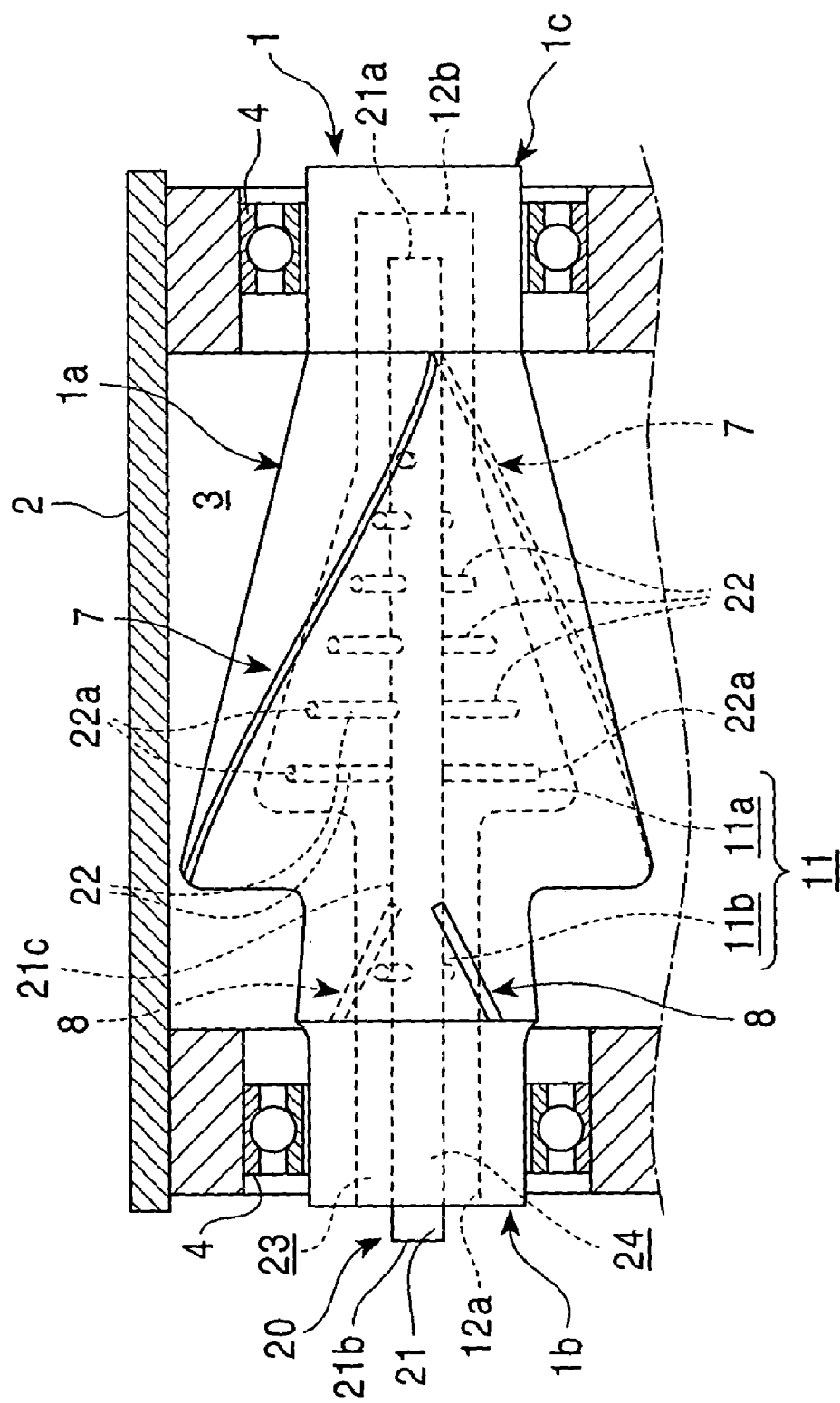
FIG. 1 is a schematic front elevation view of a rotor having a heat exchange system according to an embodiment of the present invention.

Embodiments of the present invention will now be described with reference to FIGS. 1 to 10. As shown in FIG. 1, a heat exchange system according to the present invention is included in, for example, a pair of rotors 1 of a bi-axial kneader (only one rotor 1 is shown in FIG. 1). Each rotor 1 is rotatable in a casing 2 of the kneader. A pipe (not shown) is attached to the outer surface of the casing 2 through which a kneaded object is cooled or heated. The casing 2 includes a kneading chamber 3 containing the kneaded object. The kneading chamber 3 is cocoon-shaped in longitudinal section in order to accommodate the pair of rotors 1.

The rotors 1 are disposed such that their axes are parallel to each other, and rotate in opposite directions by a drive unit (not shown). Both rotors 1 have the same shape and have long blades 7 and short blades 8, which will be described hereinafter. Arrangements of the long blades 7 and the short blades 8 on the rotors 1 are axially opposite to each other.

Figure 2:
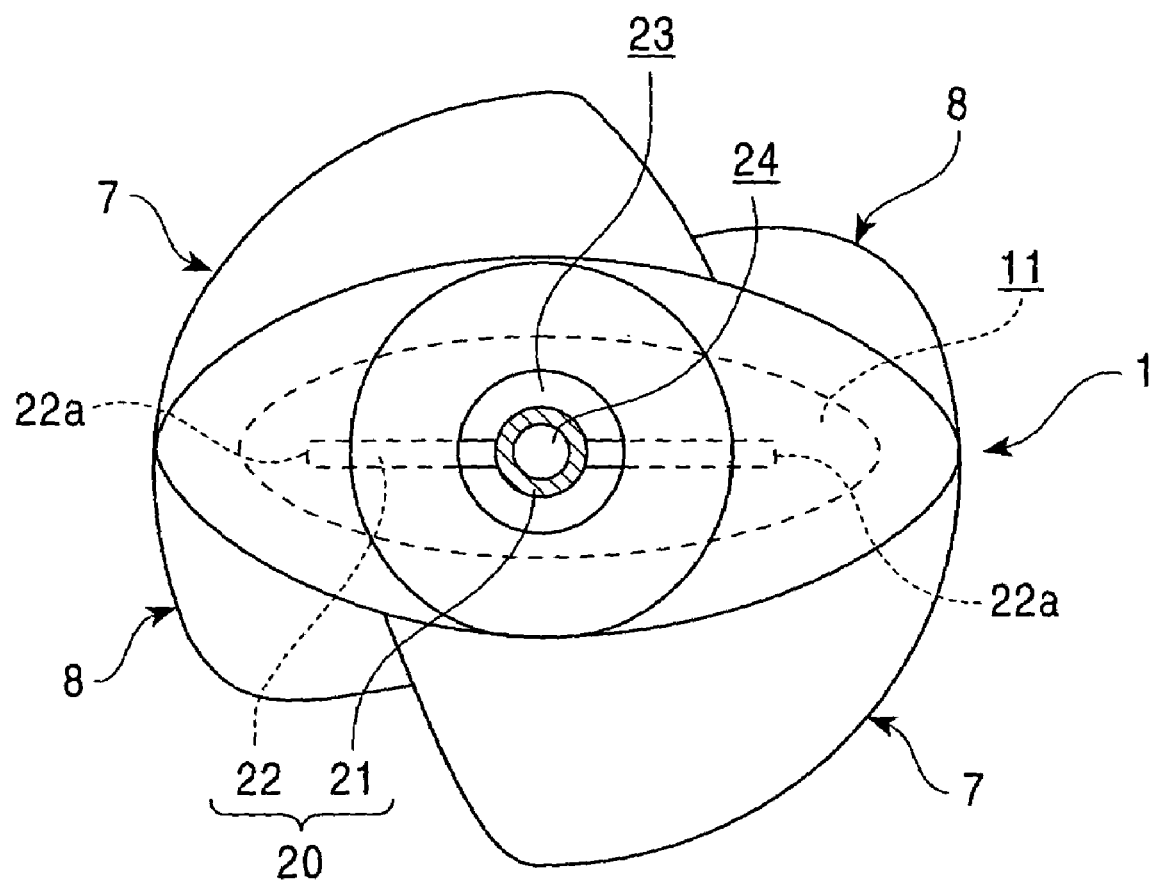
FIG. 2 is a side elevation view of the rotor.

Each rotor 1, which is disposed in the kneading chamber 3, has a kneading portion 1a, in contact with the kneaded object, and rotor holders 1b and 1c at both longitudinal ends of the kneading portion 1a. As shown in FIG. 2, the kneading portion 1a has the two long blades 7, which are disposed at a circumferential interval of 180 degrees and axially extend; and the two short blades 8 disposed in the same manner so that the kneading portion 1a is elliptical in longitudinal section, which is perpendicular to the axis. Each long blade 7 spirals clockwise from one end (the right in the drawing) to a point adjacent to the other end (the left in the drawing) of the kneading chamber 3. On the other hand, each short blade 8 spirals counterclockwise from the above mentioned point to the other end of the kneading chamber 3. Thus, the long blade 7 and the short blade 8 function as a feeder blade and a return blade, respectively, during a kneading operation. Spiral angles of the long blade 7 and the short blade 8 range from 30 degrees to 60 degrees. At least one of the spiral angle and the spiral direction may be changed continuously or discontinuously.

The kneading portion 1a, as described above, has a heat-exchange chamber 11 therein, in which a heat transfer medium flows. The heat transfer medium, for example, is cooling/heating water, hot oil, or steam. The heat-exchange chamber 11 includes a long-blade space 11a and a short-blade space 11b which corresponds to the spaces for the long blade 7 and the short blade 8, respectively. In order to follow the shape of the outer surface of the long blade 7, the long-blade space 11a is elliptical in longitudinal section, and each edge of the long-blade space 11a is in the same direction as that of the long blade 7. The long-blade space 11a spirals clockwise from one end to a point adjacent to the other end of kneading portion 1a. On the other hand, in order to follow the shape of the outer surface of the short blade 8, the short-blade space 11b is elliptical in longitudinal section and each edge of the short-blade space 11b is in the same direction as that of the short blade 8. The short-blade space 11b spirals counterclockwise from the above mentioned point to the other end of the kneading portion 1a.

Rotor holders 1b and 1c are coaxially formed on both top portions of the kneading portion 1a, respectively. The shape of the rotor holders 1b and 1c is a circular cylinder. The rotor holders 1b and 1c are surrounded by bearings 4. The bearings 4 are fitted on one side and the other side of the casing 2 to rotatably support the rotor 1 in the casing 2.

The rotor holders 1b and 1c have holes 12a and 12b respectively. The hole 12a of the rotor holder 1b extends from one end to the other end of the rotor holder 1b along its axis, while the hole 12b of the rotor holder 1c extends from one end adjacent to the kneading portion 1a to a point near the other end so that the other end of the rotor holder 1b, which is opposite to the kneading portion 1a, is sealed. Thus, the holes 12a, 12b, and the heat-exchange chamber 11 are aligned along the rotation axis of the rotor 1 to form the rotor 1.

The holes 12a and 12b are circular in longitudinal section. The holes 12a and 12b have diameters less than the maximum diameter of the heat-exchange chamber 11. For example, a diameter of the long axis of the heat-exchange chamber 11 is 3 times the diameter of the holes 12a and 12b, a diameter of the short axis is the same as the diameter of the holes 12a and 12b, and a length of the heat-exchange chamber 11 in transverse section is about 6 times the diameter of the holes 12a and 12b.

The hole 12a of the rotor holder 1b functions as an inlet for inserting or removing a heat-transfer-medium supply pipe 20, and as a feeding-and-discharging path for the heat transfer medium. The heat-transfer-medium supply pipe 20 includes a main tube 21, which is insertable into and removable from the heat-exchange chamber 11 through the hole 12a, and branch tubes 22, which are described below. An external diameter of the main tube 21 is determined such that a given space is ensured between the main tube 21 and the hole 12a. For example, the external diameter of the main tube 21 is 0.4 times the diameter of the hole 12a. Thus, the rotor holder 1b has a double-pipe structure, which has an outer flow path 23 of the heat transfer medium that communicates with the heat-exchange chamber 11 and an inner flow path 24 of the heat transfer medium that is blocked from the heat-exchange chamber 11.

The main tube 21 rotates at the same rotational velocity as the rotor 1. The main tube 21 may be driven via a spacer provided in the hole 12a of the rotor holder 1b, or by connecting the main tube 21 to a drive unit of the rotor 1 directly.

Further, the main tube 21 has a front end 21a which is sealed, a back end 21b which is open, and a body section 21c which resides between the front end 21a and the back end 21b. The front end 21a of the main tube 21 is disposed in the hole 12b of the rotor holder 1c, while the back end 21b of the main tube 21 protrudes from the system. A heat-transfer-medium feeding and discharging means is attached to both the back end 21b of the main tube 21 and one end of the rotor holders 1b via a rotary joint (not shown). The heat-transfer-medium feeding and discharging means, which has a pipe and a pump, feeds the heat transfer medium to the inner flow path 24 in the main tube 21 and discharges the heat transfer medium from the outer flow path 23, which is outside the main tube 21. Reversely, the heat-transfer-medium feeding and discharging means may discharges the heat transfer medium from the inner flow path 24 and may feeds it into the outer flow path 23.

The body section 21c of the main tube 21 includes a plurality of branch tubes 22. When the main tube 21 is inserted or removed, each branch tube 22 can pass through the outer flow path 23, which is the space between the main tube 21 and the periphery of the hole 12a. In addition, each branch tube 22 is flexible so that it is pushed sideways while passing through the outer flow path 23 and rises upwards after passing through. An anchor end of each branch tube 22 is attached to the body section 21c by caulking, welding, or the like so that each branch tube 22 extends perpendicularly on the surface of the body section 21c towards the surface of the heat-exchange chamber 11.

In this embodiment, each branch tube 22 is composed of a coiled spring whose turns are in close contact with each other in a free state to be flexible. For example, the external diameter of the branch tube 22 is about 0.12 times the diameter of the hole 12a so that each branch tube 22 can pass through the outer flow path 23. The branch tubes 22 are disposed in the long-blade space 11a and the short-blade space 11b. In the long-blade space 11a, six pairs of the branch tubes 22, twelve tubes in total, are disposed such that two tubes of each pair are at a circumferential interval of 180 degrees around a periphery of the body section 21c. Each pair is spirally arranged such that the free top end of the branch tube 22 faces the edges of the long-blade space 11a. Also, two of the branch tubes 22 are at a circumferential interval of 180 degrees around a periphery of the body section 21c in the short-blade space 11b. The top end of each tube faces the edges of the short-blade space 11b. More than two branch tubes 22 may be disposed in the short-blade space 11b.

The length of each branch tube 22 is determined such that the top end thereof is adjacent to the surface of the edges of the long-blade space 11a and the short-blade space 11b. For example, the length of the branch tube 22 is about 1.3 times the diameter of the hole 12a. An opening 22a is formed at the top end of each branch tube 22. The main tube 21 communicates with the heat-exchange chamber 11 through the branch tube 22 by the opening 22a. Thus, the branch tube 22 allows the heat transfer medium to be ejected from a position adjacent to the edges of the long-blade space 11a and the short-blade space 11b, after the heat transfer medium in the main tube 21 is moved to the opening 22a without a decrease in flow velocity due to flow resistance of a heat transfer medium in the heat-exchange chamber 11.

The total number of the branch tubes 22 is determined such that the total flow cross-sectional area of the openings 22a of the branch tubes 22 is less than or equal to that of the main tube 21 in order to produce a jet stream of the heat transfer medium. For example, the inner diameter of the branch tube 22 is about 0.08 times the diameter of the hole 12a. The total flow cross-sectional area of the branch tubes 22 is preferably less than or equal to a half of the flow cross-sectional area of the main tube 21 to produce a uniform jet stream from each branch tube 22.

According to the embodiment of the present invention, a method for manufacturing the rotor 1 and a kneader having the heat exchange system will now be described.

Figure 3:
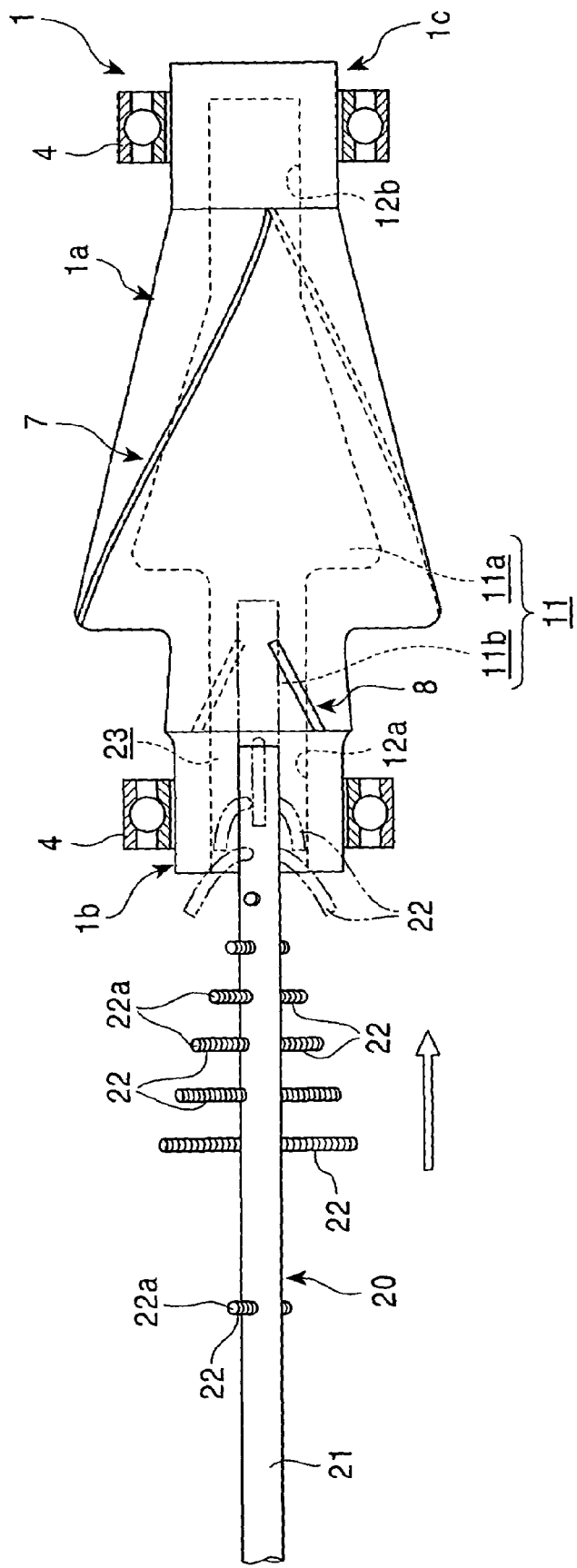
FIG. 3 is an explanatory view showing a heat-transfer-medium supply pipe being attached to the rotor.
Figure 4:
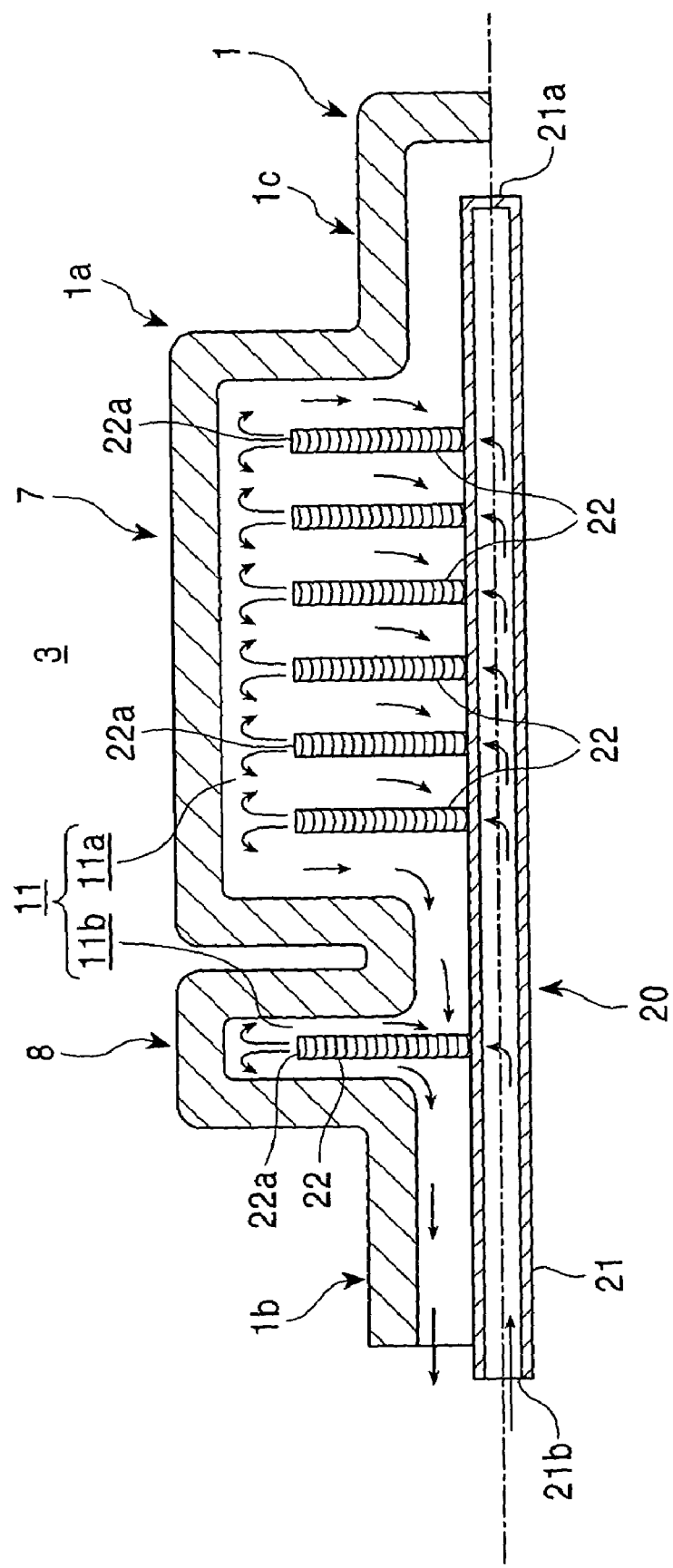
FIG. 4 is an explanatory view showing the flow of a heat transfer medium in a heat-exchange chamber.

As shown in FIG. 3, a pipe, which has given outer and inner diameters, is cut into a given length, and its top end is sealed. Then, holes are drilled on a surface of the pipe at certain positions that face the edges of the long-blade space 11a and the short-blade space 11b of the heat-exchange chamber 11. This pipe becomes the main tube 21. Coiled springs whose turns are in close contact with each other in a free state are prepared as the branch tubes 22. They are perpendicularly inserted into the holes and are welded. As a result, the heat-transfer-medium supply pipe 20, which consists of the main tube 21 and the branch tubes 22, is formed.

As shown in FIG. 1, the rotor 1 formed by casting or the like is mounted in the casing 2 via bearings 4. As shown in FIG. 3, the heat-transfer-medium supply pipe 20 disposed outside the rotor holder 1b of the rotor 1 is moved towards the rotor 1 (shown by the arrow in the drawing) with the rotor 1 and the main tube 21 coaxially aligned. Thus, the heat-transfer-medium supply pipe 20 is inserted into the heat-exchange chamber 11 since the hole 12a of the rotor holder 1b functions as an insertion/removal opening of the heat-transfer-medium supply pipe 20.

While the heat-transfer-medium supply pipe 20 is inserted, the branch tube 22 which stands perpendicularly on the body section 21c of the main tube 21 is put into contact with the end face of the rotor holder 1b. Accordingly, the rotor holder 1b pushes the branch tube 22. The branch tube 22 is composed of a coiled spring having flexibility. Therefore, the branch tube 22 is pushed sideways by the pushing force and moves through the hole 12a with the main tube 21 while following the surface of the hole 12a. The branch tube 22 rises upwards after it enters the heat-exchange chamber 11 due to the flexibility.

As shown in FIG. 1, the positions of the rotor 1 and the heat-transfer-medium supply pipe 20 are adjusted so that the openings 22a of the branch tubes 22 face the edges of the long-blade space 11a and the short-blade space 11b of the heat-exchange chamber 11, and then the heat-transfer-medium supply pipe 20 is secured to the rotor 1. A rotary joint (not shown) is mounted on the end portions of the main tube 21 and the rotor holder 1b through which the heat-transfer-medium supply pipe 20 is connected to a pipe or the like of a heat-transfer-medium feeding and discharging means to form a kneader.

When inspecting or repairing the heat-transfer-medium supply pipe 20, the main tube 21 is removed from the heat-exchange chamber 11 through the hole 12a in the reverse procedure described above. Thus, the heat-transfer-medium supply pipe 20 is removed from the system.

An operation of the rotor 1 having the heat exchange system according to this embodiment and the kneader will now be described. In this embodiment, cooling water is used as the heat transfer medium. However, the heat transfer medium is not limited to cooling water. A heat transfer medium such as hot water or steam may be supplied to flow in a cooling pipe depending on a composition or a type of a kneaded material to be heated.

An inlet (not shown), which is disposed in the casing 2, is opened. The kneaded materials, such as rubbers or plastics, and fillers are loaded from the inlet to the kneading chamber 3. After the kneading chamber 3 is sealed, cooling water is supplied in a pipe, which is in contact with the outer surface of the casing 2, to cool the materials in the kneading chamber 3 via the casing 2.

Additionally, cooling water is fed to the main tube 21 from a heat-transfer-medium feeding and discharging means (not shown). The cooling water flows into the branch tube 22 mounted on the body section 21c of the main tube 21 after it flows through the main tube 21. The cooling water is ejected from the opening 22a formed on the top end of the branch tube 22 to the edges of the long-blade space 11a and the short-blade space 11b of the heat-exchange chamber 11.

The cooling water does not flow into the branch tube 22 through a side wall thereof, since the branch tube 22 is composed of a coiled spring whose turns are in close contact with each other in a free state. As a result, the cooling water in the branch tube 22 does not have any flow resistance except for flow resistance by the wall of the branch tube 22. Thus, the cooling water is ejected from the opening 22a at a high flow velocity.

Figure 5:
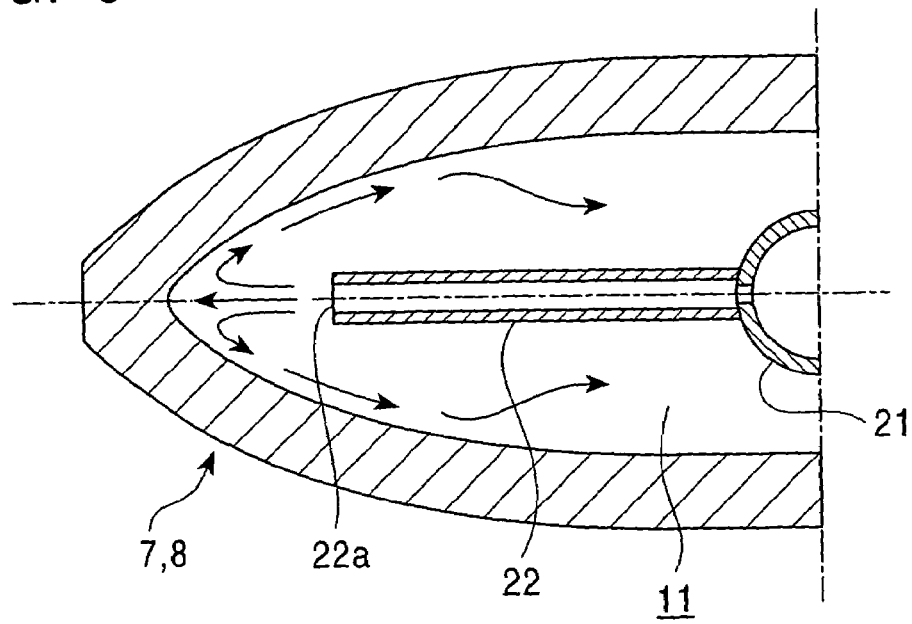
FIG. 5 is an explanatory view showing a setting of the branch tube.

As shown in FIG. 5, the branch tube 22 in the heat-exchange chamber 11 extends substantially perpendicularly by its rigidity so that the opening 22a is adjacent to the edge of the heat-exchange chamber 11. Accordingly, a short distance between the opening 22a and the edge of the heat-exchange chamber 11 suppresses a decrease in flow velocity due to flow resistance even if the cooling water in the heat-exchange chamber 11 has high flow resistance. As a result, the cooling water ejected from the opening 22a at a high flow velocity slightly loses the flow velocity and hits against the adjacent edge of the heat-exchange chamber 11. The cooling water flows along the inner surface of the long blade 7 and the short blade 8. That is, the cooling water flows near the surface of the heat-exchange chamber 11 rapidly and turbulently. This provides a high cooling capability, namely, a high heat exchange capability to the whole rotor 1.

Further, the cooling water ejected from each branch tube 22 has almost the same temperature since the main tube 21 and the branch tube 22 prevent the cooling water from contacting with the cooling water inside the heat-exchange chamber 11 while functioning as a heat insulator. This flow of the cooling water with almost the same temperature along the axis of the rotor 1 allows for uniform provision of the above-described high cooling capability over the whole rotor 1. As shown in FIG. 1, after the rotor 1 is cooled in the above-described manner, it is rotated with the loaded materials sheared and mixed in the kneading chamber 3 to produce a resulting kneaded object with desired kneading conditions. In this case, the kneaded materials are heat-exchange objects. Uniform and sufficient cooling of the objects by the rotor 1 and the casing 2 obviates disadvantages such as deterioration of the objects by overheating.

As previously explained, the heat exchange system according to an embodiment of the present invention includes the rotor 1 (a body), the hole 12a, the main tube 21, and the branch tubes 22. The rotor 1, the outer surface of which is in contact with a kneaded object (heat-exchange object), has the heat-exchange chamber 11 therein, in which a heat transfer medium such as water flows. The hole 12a (an inlet), which is formed on one end of the rotor 1, has a diameter less than that of the heat-exchange chamber 11.

The main tube 21 has a predetermined diameter so that a given space is ensured between the hole 12a and the main tube 21. The main tube 21 is insertably disposed in the heat-exchange chamber 11 through the hole 12a and communicates with the heat-exchange chamber 11. The heat transfer medium is fed or discharged through the main tube 21. The branch tubes 22 extend from the periphery of the main tube 21 towards the surface of the heat-exchange chamber 11 and each of the branch tubes 22 has the opening 22a on the top end, through which the main tube 21 communicates with the heat-exchange chamber 11. The branch tubes 22 are flexible so that they can pass through the space described above when the main tube 21 is inserted or removed. The hole 12a according to this embodiment, which is the inlet, may be formed on both end surfaces of the rotor 1.

According to the structure described above, the heat transfer medium having almost the same temperature is ejected from each opening 22a of the branch tube 22 since the main tube 21 and the branch tube 22 prevent the heat transfer medium from contacting with a heat transfer medium inside the heat-exchange chamber 11. The branch tube 22 extends from the periphery of the main tube 21 towards the surface of the heat-exchange chamber 11 so that the opening 22a of the branch tube 22 is closer to the surface of the heat-exchange chamber 11 than to the periphery of the main tube 21. As a result, the heat transfer medium in the heat-exchange chamber 11 resists the flow of the heat transfer medium ejected from the branch tube 22 in such a short distance that the heat transfer medium hits against the surface of the heat-exchange chamber 11 at a high flow velocity. Accordingly, the heat transfer medium with axially uniform temperature distribution flows near the surface of the heat-exchange chamber 11 rapidly and turbulently. This produces a high uniform heat exchange capability over the whole rotor 1.

Further, the branch tube 22 is formed such that it can pass through the space between the main tube 21 and the hole 12a. In addition, it is flexible. Accordingly, the branch tube 22 can be oriented towards the surface of the heat-exchange chamber 11 by just inserting the main tube 21 into the heat-exchange chamber 11 through the hole 12a even if the heat-exchange chamber 11 has a complicated-shaped surface. The branch tube 22 can be removed from the system with the main tube 21 by just removing the main tube 21 through the hole 12*a*. The ease of removing the main tube 21 and the branch tube 22 provides the heat exchange system with excellent cooling capability described above in a simple way and at low cost. Additionally, a ready-made component for the body of the rotor 1 may be used, if it is available.

According to an embodiment of the present invention, the opening 22*a* of the branch tube 22 is preferably disposed adjacent to the surface of the heat-exchange chamber 11. This provides high heat-exchange capability to the rotor 1. While a preferred embodiment of the invention has been illustrated and described, the present invention can be modified in other various ways without departing from the spirit and scope of the invention.

Figure 6:
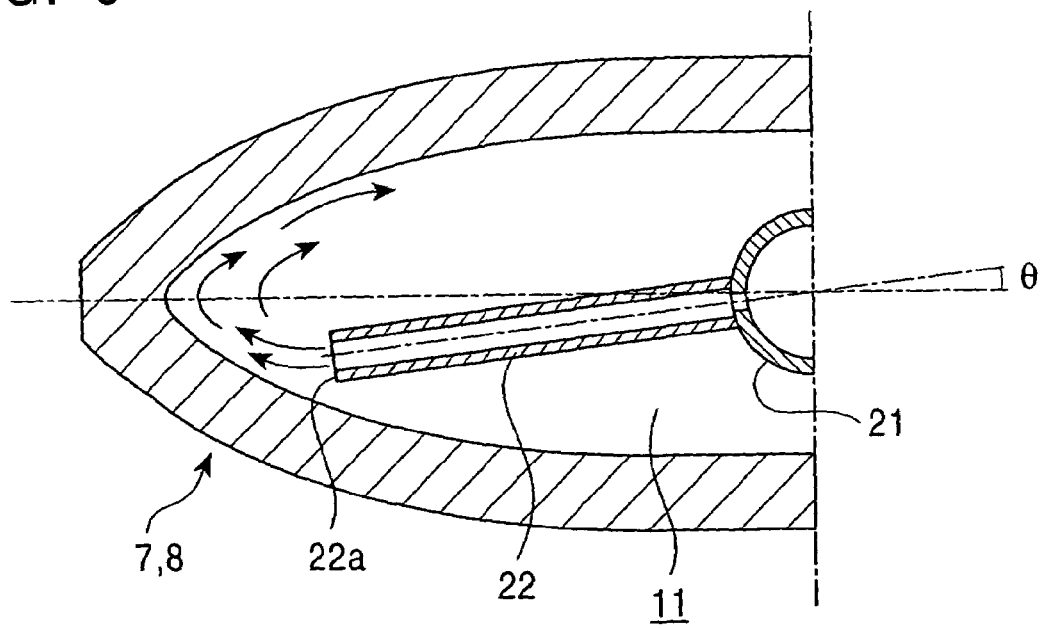
FIG. 6 is an explanatory view showing another setting of the branch tube.

That is, according to an embodiment of the present invention, as shown in FIG. 5, the opening 22*a* of the branch tube 22 faces the edge of the heat-exchange chamber 11. However, the present invention is not limited thereto. As shown in FIG. 6, the opening 22*a* may face a point shifted from the edge of the heat-exchange chamber 11 by inclining the branch tube 22 at a given angle θ relative to a line drawn between the axis of the main tube 21 and the edge of the heat-exchange chamber 11. In this case, the heat transfer medium spirally flows in the heat-exchange chamber 11.

Figure 7:
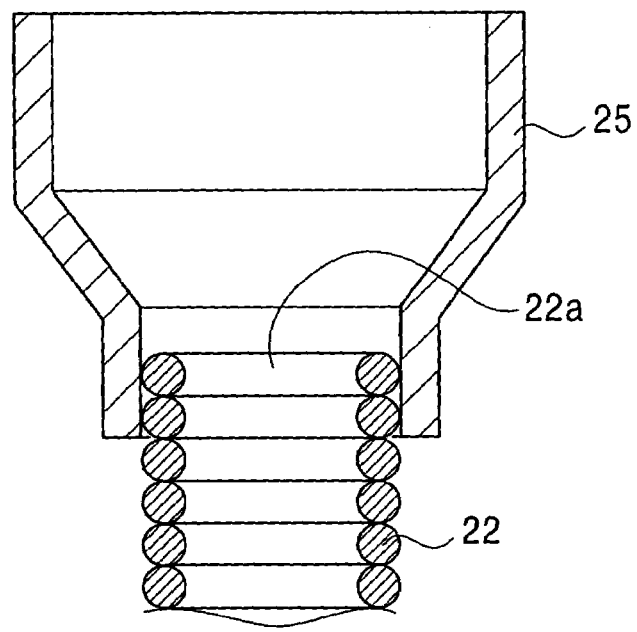
FIG. 7 is a front elevation view of an essential part of the branch tube with a nozzle.
Figure 8:
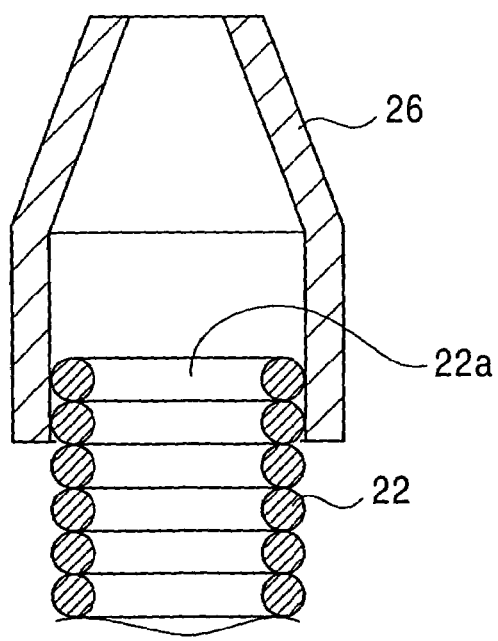
FIG. 8 is a front elevation view of an essential part of the branch tube with another nozzle.

According to an embodiment of the present invention, the opening 22*a* of the branch tube 22 is opened without any components. Either a nozzle 25 with a diameter longer than that of the opening 22*a* or a nozzle 26 with a diameter shorter than that of the opening 22*a* may be attached to the opening 22*a*, as shown in FIG. 7 or 8, respectively. In this case, a flow direction of the heat transfer medium ejected from the branch tube 22 can be desirably corrected by the nozzle 25 or 26. The nozzle 25 with the larger diameter shown in FIG. 7 enables a temperature distribution, namely, a heat exchange capability to be more uniform, since the heat transfer medium divergently flows and hits against a large area of the surface of the heat-exchange chamber 11. On the other hand, the nozzle 26 with the smaller diameter shown in FIG. 8 can selectively enhance the heat exchange capability for a desired area since the heat transfer medium flows at a higher velocity.

Figure 9:
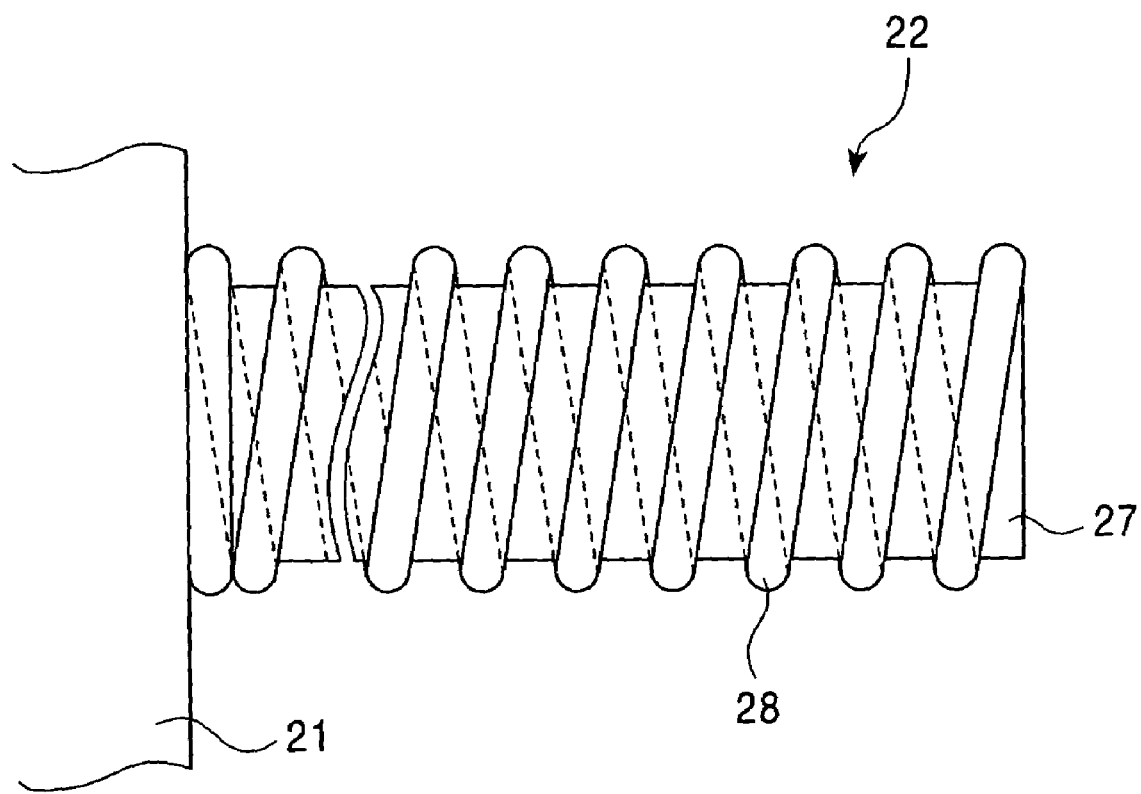
FIG. 9 is a front elevation view of a branch tube.

According to an embodiment of the present invention, the branch tube 22 is composed of a coiled spring whose turns are in close contact with each other in a free state. However, its application is not limited thereto. The branch tube 22 may be composed of a pipe 27 having flexibility and leaktight to a fluid and a coiled spring 28 wound around the pipe 27 to support it, as shown in FIG. 9. The pipe 27 of this structure assuredly eliminates an influence of the heat transfer medium around the branch tube 22. Additionally, the branch tube 22 may be composed of flexible thin wires, such as piano wires, in a way that a plurality of the wires are disposed in parallel to form a wall of the branch tube 22.

Figure 10:
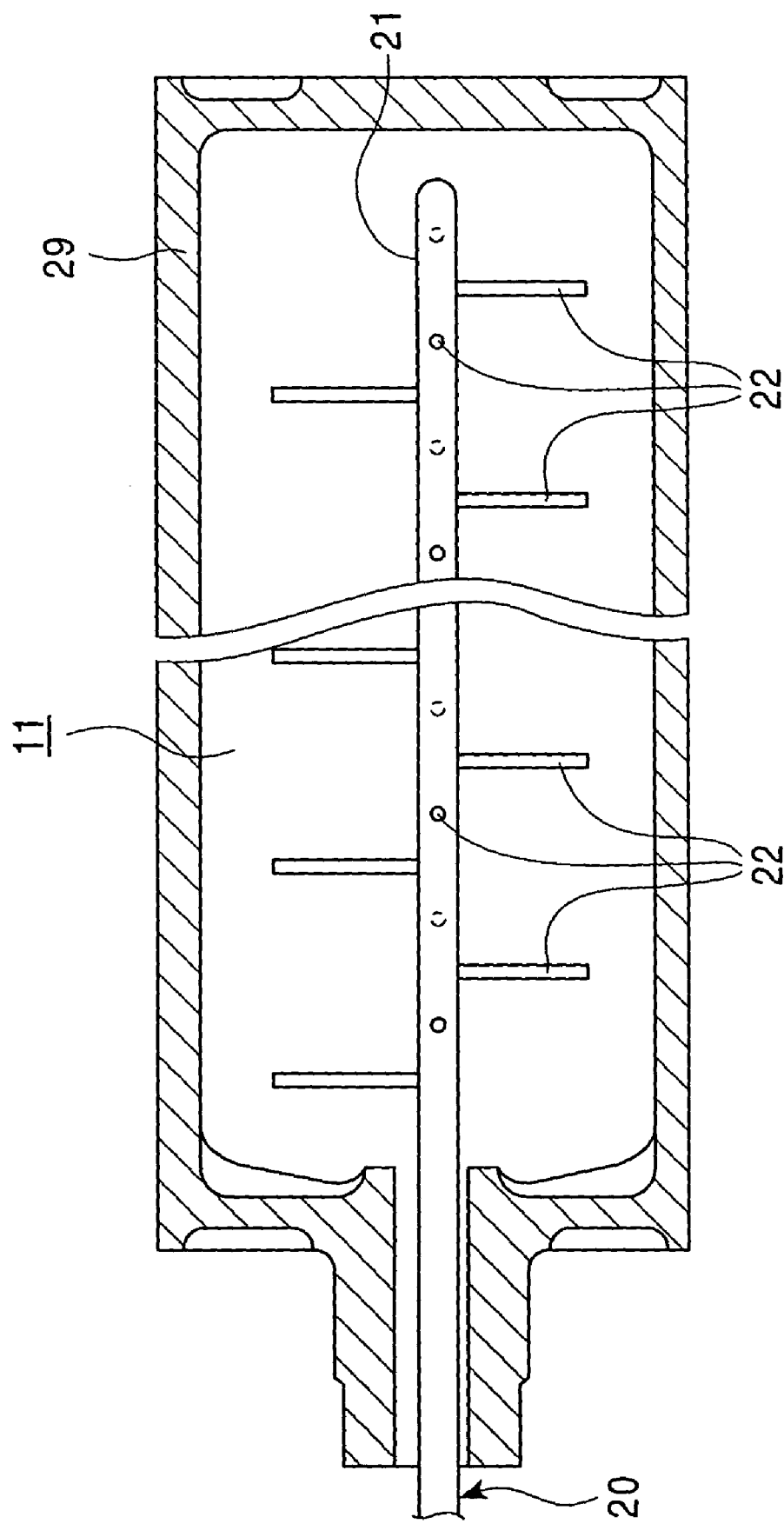
FIG. 10 is a two-part fragmentary sectional view of the rotor having the heat exchange system.

Furthermore, according to an embodiment of the present invention, the heat exchange system is installed in the rotor 1 of the kneader. However, its application is not limited thereto. As shown in FIG. 10, it may be installed in a cylindrical roller 29, which is used for various processes of raw materials or fabricated materials such as coating or rolling. The roller 29 may be a bored roll or a drilled roll. In a structure in which the heat exchange system is installed in the cylindrical roller 29, the main tube 21 may be separated from the roller 29 so that only the main tube 21 is rotated while the heat-transfer-medium supply pipe 20 is unmovably secured. In addition, the heat exchange system according to an embodiment of the present invention can be applied to every apparatus with a structure in which a heat transfer medium flows inside a body of the apparatus and exchanges heat with a heat-exchange object in contact with the outer surface of the body.

What is claimed is:

1. A kneading or extruding rotor including a heat exchange system comprising:
   a rotor body having an outer surface in contact with a heat-exchange object;
   a heat-exchange chamber in said body, a heat transfer medium flowing in said heat-exchange chamber;
   an inlet formed on at least one end of said body with a diameter less than that of said heat-exchange chamber;
   a main tube, the heat transfer medium flowing in or flowing out of said main tube, said main tube being insertably disposed in said heat-exchange chamber through said inlet and having a predetermined diameter so that a given space is ensured between said inlet and said main tube; and
   branch tubes mounted on the outer surface of said main tube, each of said branch tubes having an opening on the top through which said main tube communicates with said heat-exchange chamber, said branch tubes being flexible and resilient, thereby being capable of deforming when passing through the space when said main tube is inserted or removed, and substantially returning to its original form.

2. The kneading or extruding rotor according to claim 1, wherein said branch tubes extend towards the surface of said heat-exchange chamber.

3. The kneading or extruding rotor according to claim 1, wherein each of said branch tubes has a nozzle on the opening.

4. The kneading or extruding rotor according to claim 1, wherein each of said branch tubes comprises a coiled spring whose turns are in close contact with each other in a free state.

5. The kneading or extruding rotor according to claim 1, wherein each of said branch tubes comprises a tube having flexibility and being leaktight to a fluid, and a coiled spring wound around the tube to support the tube.

6. The kneading or extruding rotor according to claim 1, wherein said heat-exchange chamber has a non-circular cross-section and is twisted along the axis of said heat-exchange chamber.

\* \* \* \* \*